F. G. Beach,
Can Opener.
No. 88,536. Patented Apr. 9, 1869.

Witnesses:
Wm. N. Sterne
Geo. H. Read

Inventor:
F. G. Beach
by Prindle & Dyer, Attys.

F. G. BEACH, OF HARTFORD, CONNECTICUT.

Letters Patent No. 88,536, dated April 6, 1869.

IMPROVEMENT IN CAN-OPENERS.

The Schedule referred to in these Letters Patent and making part of the same.

*To all whom it may concern:*

Be it known that I, F. G. BEACH, of Hartford, in the county of Hartford, and in the State of Connecticut, have invented a new and useful Improvement in Can-Openers; and do hereby declare that the following is a full, clear, and exact description thereof, reference being had to the accompanying drawing, making a part of this specification, in which—

Figure 1:
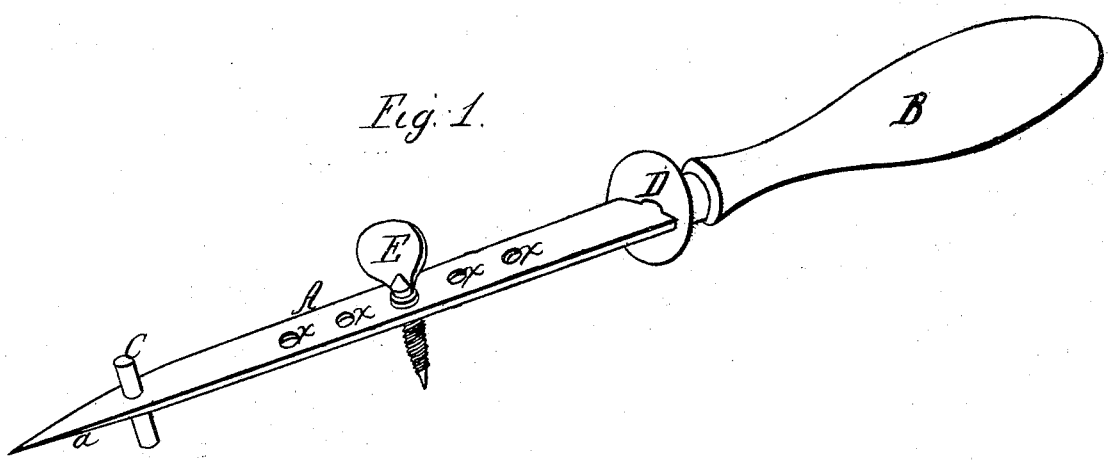

Figure 1 is a perspective view of the opener, and

Figure 2:
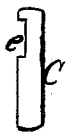

Figure 2, a detached view of the cross-bar, or pin, which furnishes a fulcrum for said opener, when the knife upon its end is used.

Letters of like name and kind refer to like parts in each of the figures.

My invention relates to a class of devices, known as can-openers, for opening tin cans used for containing fruits, &c.; and It consists, principally, in the use of a cutter, in the form of a circular disk, which is pivoted upon the shank of the frame, near the handle, at a right angle with said frame, so that when the latter is caused to revolve around an axial pivot, secured within one end of a can, and the cutter caused to rotate, by pressing down upon the handle, said cutter shall divide, or cut the tin.

It further consists of a pointed steel screw, which, in connection with a series of holes in the frame, forms an adjustable axial pivot for said cutter; and, also, of the use of a pin, passing through the frame, at a right angle therewith, which serves as a fulcrum for said frame, when used as a lever for opening square cans, by means of the cutting-edge at the end thereof; and, further, of the notch upon the under side of said pin, by means of which the opener is kept in position near the edge of a can.

In the annexed drawing—

A represents the frame of the opener, consisting of a flat piece of steel, one-eighth of an inch thick, one inch wide, and about seven inches long, having upon one end a shank, upon which a handle, B, is secured.

One edge of the frame is straight, and is provided with a cutting-edge, *a*, one inch in length, at its end, while the opposite edge of said frame is curved inward toward the outer end, so as to produce a point similar to that upon a knife.

C represents a pin, one inch in length, and one-fourth of an inch in diameter, passing through the frame, near the outer end, and at a right angle to its face, which serves as a fulcrum for said frame, when used for opening square cans, by resting upon their top and edge, while the cutting-edge *a* is pried upward by depressing the handle.

In order to guide the opener, and keep the cutting-edge close to the side of the box, or can, the lower side of the pin C is notched out, (as shown in fig. 2,) so as to rest over and upon the edge of said box.

For opening round cans, another cutter, D, is provided, consisting of a round disk of steel, with its entire circumference sharpened, so as to produce a cutting-edge.

This cutter is pivoted upon the shank, next to the inner end of the handle, and operates in connection with an axial pivot, E, secured to the centre of the can, and around which the frame and cutter are caused to revolve, dividing, or cutting in a circle through the tin.

The axial pivot E consists of a pointed steel screw, passing through a hole in the frame A, which may be readily forced through the end of a can, and secured thereto by means of the thread cut thereon. To permit of the adjustment of this pivot, so as to allow a large or small circle to be described by the cutter D, a number of holes, *x x x*, &c., is provided in the frame.

The operation of this device is as follows:

In opening square cans, or boxes, the outer end of the frame is forced through the tin, so as to bring the cutting-edge *a* upward, with its straight face next to the side of the box, and the handle depressed, causing the pin C to rest upon the top of said box, where it serves as a fulcrum, by means of which, as the handle is depressed, the knife is raised, and the tin divided for a short distance, after which the handle must be raised and pushed forward, and is then ready for a repetition of the cutting-operation.

In opening round cans, the pivot E is adjusted so as to make the distance between it and the circular cutter D a little less than one-half the diameter of the can to be operated upon, and is then forced through the centre of said can, and screwed down until firmly fixed.

The operator now presses down upon the handle, and, at the same time, moves it forward, causing the sharp edge of the cutter to roll upon and divide the tin, which, when the circle has been traversed, may be readily removed.

This device possesses many advantages, among which are durability, convenience, and simplicity of construction.

The circular cutter has a cutting-edge, equal in extent to at least one dozen, of the form ordinarily used, and this, together with its peculiar manner of dividing the tin, whereby less friction and wear are caused, renders the opener far more durable than any other in use.

In regard to its convenience and simplicity, it is only necessary to state, that while capable of opening both square and round cans, its parts are so few, and easy of construction, that it is believed that it can be furnished at a less cost than any now in market.

Having thus fully set forth the nature and merits of my invention,

What I claim as new, is—

The circular cutter D, pivoted upon the frame A, and operating in connection with an axial pivot, or other guide, for the purpose of dividing the tin, substantially as shown and described, and for the purpose set forth.

Also, the notched pin C, in combination with the frame A and cutting-edge a, substantially as and for the purpose shown.

Also, the axial pivot E, when constructed in the manner and for the purpose herein shown and described.

Also, the within-described can-opener, consisting of the frame A, cutting-edge a, pin C, circular cutter D, axial pivot E, and holes x x x, &c., or their equivalent, in said frame, all constructed and arranged, substantially as and for the purpose herein specified.

In testimony that I claim the foregoing, I have hereunto set my hand, this 20th day of February, 1869.

F. G. BEACH.

Witnesses:
J. W. JOHNSON,
EDWARD B. BENNETT.